United States Patent [19]

Lloyd

[11] Patent Number: 5,130,030
[45] Date of Patent: Jul. 14, 1992

[54] METHOD AND AN AUTOMATIC DEVICE FOR THE SHARP SEPARATION AND REMOVAL OF LAYERS OF FLUIDS FROM A CONTAINER BY WAY OF THE CONTAINER HEADSPACE AND FOR THE AUTOMATIC CLEANING OF THE CONTAINER

[75] Inventor: Michael Lloyd, Mequon, Wis.

[73] Assignee: Otto Tuchenhagen GmbH & Co. KG, Fed. Rep. of Germany

[21] Appl. No.: 422,795

[22] Filed: Oct. 18, 1989

[30] Foreign Application Priority Data

Oct. 19, 1988 [DE] Fed. Rep. of Germany ....... 3835553

[51] Int. Cl.⁵ .................... B01D 17/02; B01D 17/032
[52] U.S. Cl. .................................... 210/739; 210/744; 210/745; 210/776; 210/790; 210/96.1; 210/800; 210/513; 210/515; 210/103; 210/115
[58] Field of Search ....................... 210/96.1, 103, 513, 210/514, 515, 739, 744, 745, 776, 790, 800, 115, 803; 137/590; 426/495; 99/276, 277, 277.1

[56] References Cited

U.S. PATENT DOCUMENTS

4,401,568 8/1983 Cain .................................... 210/515
4,904,396 2/1990 Benet ................................... 210/745

FOREIGN PATENT DOCUMENTS

61-204014 9/1986 Japan .................................. 210/513

*Primary Examiner*—Stanley S. Silverman
*Assistant Examiner*—Neil M. McCarthy
*Attorney, Agent, or Firm*—Lane, Aitken & McCann

[57] ABSTRACT

A method for the automatic sharp separation and removal of layers of fluids from a container through a headspace in the container comprises the use of two separate and simultaneous flow streams to draw fluid from the upper layer as the apparatus descends in the fluids. The entry of the lower fluid into the apparatus is detected as a result of the different physical properties of the lower fluid by which the apparatus is caused to stop its descent into the fluid and to interrupt the flow of fluid through one of the flowsteams. The flow of the flowstream is interrupted by the entry of a gas into that stream. The apparatus is subsequently lowered into the remaining fluid and the withdrawal of the fluid through the apparatus is begun again.

25 Claims, 3 Drawing Sheets

METHOD AND AN AUTOMATIC DEVICE FOR THE SHARP SEPARATION AND REMOVAL OF LAYERS OF FLUIDS FROM A CONTAINER BY WAY OF THE CONTAINER HEADSPACE AND FOR THE AUTOMATIC CLEANING OF THE CONTAINER

BACKGROUND OF THE INVENTION

The invention pertains to a method and an automatic device for the sharp separation and removal of layers of fluids from a container by way of the container headspace and for the automatic cleaning of the container. The condition of stratified layers of fluid in a container should be understood to include situations in which a layer of sediment or lees has formed and is overlaid by a layer of clear fluid, and the two layers are separated by a stable and well-defined interface.

The Kitzinger Weinbuch, issue 1981, page 56, shows a complete wine siphon for the withdrawal of wine from its yeast layer in a glass barrel after fermentation. The suction pipe dipped into the wine via an opening in the head space of the barrel sealed by a rubber plug is connected outside the barrel to a hose. The separation between wine and yeast is effected by placing the lower end of the suction pipe close to the interface between clear wine and wine yeast and, after lowering the suction pipe during the final withdrawal phase, the wine withdrawn will be controlled by visual inspection to indicate when no clear wine is left in the barrel.

Wine cellars are confronted in principle with the same problem, but to a larger extent; and the means known heretofore to solve the problem are similar to those as described before. Here, too, containers of stratified fluids are to be found. The sediment that has collected in the barrels is overlaid by a layer of clear wine. The emptying of a barrel of wine is accomplished by way of an opening in the headspace of the barrel. The clear wine is withdrawn first and then the lees, that is, the layer of wine containing the sedimented material. During the withdrawal of the clear wine an effort is made, of course, to secure a maximum volume of the clear wine. A suction apparatus is dipped into the clear wine by way of an opening in the headspace of the barrel and lowered to a position close to the interface between the clear wine and the sediment. The correct placement of the apparatus so as to permit only clear wine to be removed and to avoid disturbing the sediment is controlled by a visual inspection of the wine as it is removed and as it passes through a viewing glass in the line. After a number of wine barrels have been so emptied, one gains some empirical estimate of the amount of the sediment present and, thus, the operation may be simplified by installing a spacer at the operation may be simplified by installing a spacer at the tip of the suction apparatus. The spacer touches the bottom of the barrel and keeps the inlet of the suction apparatus at the correct distance from the surface of the sediment so that the positioning of the suction apparatus continues to be the same from barrel to barrel. This well-known method of emptying barrels as well as the equipment used to accomplish it have shortcomings and disadvantages. It succeeds as an automatic method for emptying wine barrels only when the amounts of sediment that are formed are exactly the same from barrel to barrel. If there are variations in the development of the sediment, whether because of differences in the amount of sediment that is formed or because of differences in the form of the bottom of the barrels, the fixed position of the inlet of the suction apparatus will lead either to the drawing up of some of the sediment or to an incomplete removal of the clear wine. Furthermore, at the end of the removal of the clear wine or at the end of the removal of the wine that is full of sediment, the pick-up of air into these fluids can be held to a minimum only if the operator shuts down the operation at exactly the right moment. The contamination of wine with air has a detrimental effect on its stability. The layer of wine that is full of sediment is usually not discarded but is further processed for the recovery of the wine. Here also the pick-up of air at the end of the removal from the barrel should be kept to a minimum.

SUMMARY OF THE INVENTION

The general purpose of this invention is to provide a means for emptying a container holding fluids that have separated into stratified layers, by which the removal occurs by way of an opening in the headspace of the container, and the layers of fluid are separated cleanly from each other, in maximum yield, and with the avoidance of air pick-up.

The advantages of the method of this invention and of the apparatus for conducting it are readily apparent. The suction apparatus is more rapidly lowered into the upper layer of fluid to be removed than the fluid level falls with the action of the suction. The lowering of the apparatus is halted and the flow of the fluid is ended as soon as the layer of sediment is reached. The changeover from one fluid to the next is detected by a measuring apparatus which is sensitive to a change i the physical properties of the fluid in the product stream.

Thus, the suction apparatus is so positioned in the upper layer of fluid that a maximum yield of this fluid is assured without any contamination by a portion of the layer of sediment. The apparatus begins to suck air as soon as the upper layer of fluid has been completely removed. This change in the fluid stream interrupts the operation. The apparatus is then lowered so that the bottom layer of fluid may be removed. The end of this suction is determined when the apparatus again sucks air, and with this, the entire emptying process is completed.

The method according to the present invention permits one to render automatic the whole sequence of operations from start to finish and to provide for a sharp separation of the different fluids with the maximum possible yield and with a maximum avoidance of air pick-up.

An advantageous application of this newly invented procedure is to tilt the container during the emptying process so that the interface of the layers of fluids is kept to a minimum. This application of the method is especially well suited when the lower layer of sediment is well settled and remains distinct from the upper layer when the container is tilted. A tilting of the container permits also a more nearly complete removal of the sediment.

To avoid a contamination of the fluid wit air that enters into the container as it is emptied, a further elaboration of the method of this invention is to pass an inert gas into the headspace of this container. The volume of this gas is to be the same as the volume of the fluid removed.

As a general rule, the method of this invention is applicable to containers in which there are two fluid layers. The basic principle of this method is applicable, however, to containers holding more than two fluids, that is, in situations where more than one fluid interface is present. After the removal of the top layer of liquid, the method of this invention is applied to the second interface, and so on.

The principal feature of the apparatus for conducting the method of this invention is that two suction inlets are placed at a distance from each other at the dipping tip of the apparatus. An inner suction tube is surrounded by an outer suction tube having ring-shaped or annular inlet, the separation between the inlet of the inner suction tube and the inlet of the outer suction tube is fixed at a distance "a". The two suction tubes are each connected to a transfer line by a series of valves that permit one to combine the fluids flowing from each tube or to control them separately.

According to this invention, the flow line connected to the inner suction tube is fitted with a sensing device set to detect physical changes in the fluid stream and thus to determine the cut-off point of the fluid interface. Air pick-up is held to a minimum by either a pressure switch in the transfer line or by a pressure switch in the general system of lines. This switch is set to detect pressure changes during the suction operation.

According to the method of this invention, the inner and outer suction tubes are concentrically positioned, and the inlet of the outer suction tube is several times larger than the inlet of the inner one. The inner suction tube thus functions as a very sensitive probe while the flow through the inlet of the outer suction tube is undisturbed.

It can be readily understood from this that the yield of the upper fluid can be maximized by the annular inlet of the outer suction tube being as close as possible to the fluid interface. This approach is limited, however, by the action of the flowing fluid at the fluid interface. As already mentioned, the distance "a" of the annular inlet from the interface may be fixed by a spacer.

In order to maximize the yield of the upper liquid and to lessen the effect of the flowing fluid on the fluid interface, another part of this invention is the installation of a flange or baffle below the annular inlet of the outer suction tube. This baffle is penetrated by and perpendicular to the inner suction tube and this becomes a part of the annular inlet of the outer suction tube. With this baffle in place, the fluid entering the annular inlet of the outer suction tube flows in from the sides rather than from below the inlet. The baffle thus shields the critical inlet zone from the underlying lower lay of sediment.

In order that the probing action of the inner suction tube and the flow of fluid entering it do not disturb the fluid interface more than is minimally necessary, another provision of this invention is the positioning of a second flange or baffle below the inlet to the inner suction tube so that this inlet is also ring-shaped or annular.

It is especially advantageous to install a nephelometer or an extinction meter in the apparatus of this invention to measure the turbidity of the fluid flowing through it. This will serve to distinguish between the different layers of fluid present.

Another feature of this invention is that the outer suction tube may be fitted with a supply tube at the point where it enters the container. This permits one to pass an inert gas into the container or, after the container has been emptied, to pass cleaning solutions into the container.

BRIEF DESCRIPTION OF THE DRAWING FIGURES

DETAILED DESCRIPTION OF THE PREFERRED EMBODIMENTS

Figure 1A:
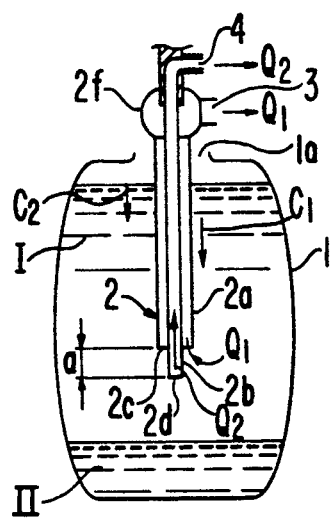
FIGS. 1a and 1b show the process of this invention when dealing with a container holding two different liquids.

As shown in FIG. 1a, there are two layers of different fluids in a container 1. Fluid I is the upper layer and Fluid II is the lower one. A suction apparatus 2 is lowered into Fluid I at velocity $c_1$, and the upper surface of this fluid is lowered at velocity $c_2$. In this first phase of operation the conditions are such that $c_1 > c_2$.

The container 1 has an opening in its headspace 1a, and through this opening the suction apparatus 2 with its outer suction tube 2a extends. The inner suction tube 2b has its inlet at its tip 2d. This tip 2d is placed below and at distance "a" from the annular inlet of tube 2a. Tubes 2a and 2b are mounted together in a housing 2f which may be fitted with one or more outlets 3 and 4. In the first phase of the operation of this apparatus, the emptying of Fluid I from the container is accomplished by way of suction tube 2a at flow volume $Q_1$. The fluid then passes through outlet 3. A flow volume $Q_2$ passes through inlet 2d of the inner suction tube 2b and then through outlet 4.

Figure 1B:
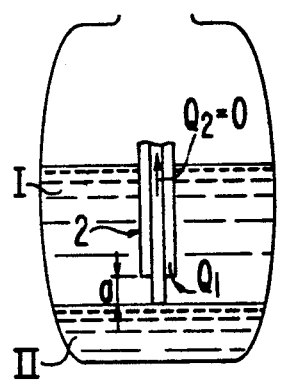

FIG. 1b shows the beginning of the second phase of the emptying process just as the flowing volume $Q_2$ picks up some of Fluid II. The changing physical properties of the flow volume $Q_2$ as the changeover from Fluid I to Fluid II occurs is utilized to halt the descent of the sucking apparatus 2 into the container 1 and also to interrupt the flow volume $Q_2$. The annular inlet 2c is thus positioned at distance "a" above the interface of the two fluids, I and II.

Figure 1C:
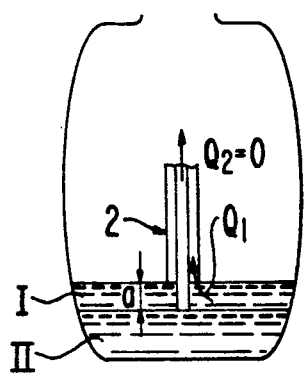

If the flow volume $Q_2$ is interrupted ($Q^2 = 0$), the third phase of the operation begins as Fluid I again passes through inlet 2c until air or an inert gas enters inlet 2c. This end of the third phase of the operation is shown in FIG. 1c.

Figure 1D:
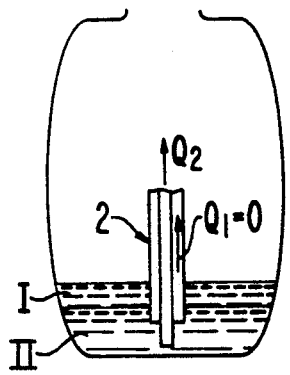

Phase 4 of the operation is shown in FIG. 1d. During this phase, the change of the physical properties of flow volume $Q_1$ causes the flow stream $Q_1$ to be interrupted ($Q_1 = 0$). The apparatus is then lowered to the deepest part of the container 1 so that the remaining volumes of Fluids I and II may be drawn up in flow stream $Q_2$. The emptying operation is complete when flow stream $Q_2$ draws up air or inert gas.

Figure 2:
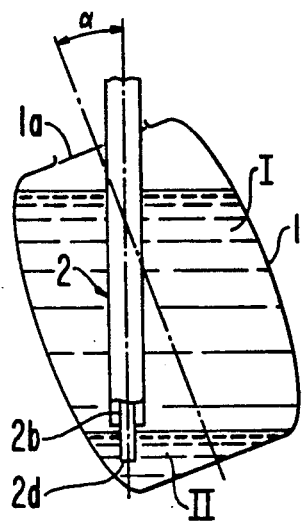
FIG. 2 shows a schematic cross-sectional view of a container being emptied while it is in a tilted position according to the method of this invention.

FIG. 2 shows the container 1 in a tilted position The apparatus 2 is set so that the inlet 2d of the inner suction tube 2b of the apparatus is placed at the deepest part of the container 1 near the region where the bottom of the container meets the sidewall. The interface between Fluids I and II is at its smallest dimension in this situation. The angle of the tilting of the container to produce angle α is dependent largely upon the dimensions of the opening 1a of the headspace of the container as well as upon the diameter of the outer suction tube 2a.

Figure 3A:
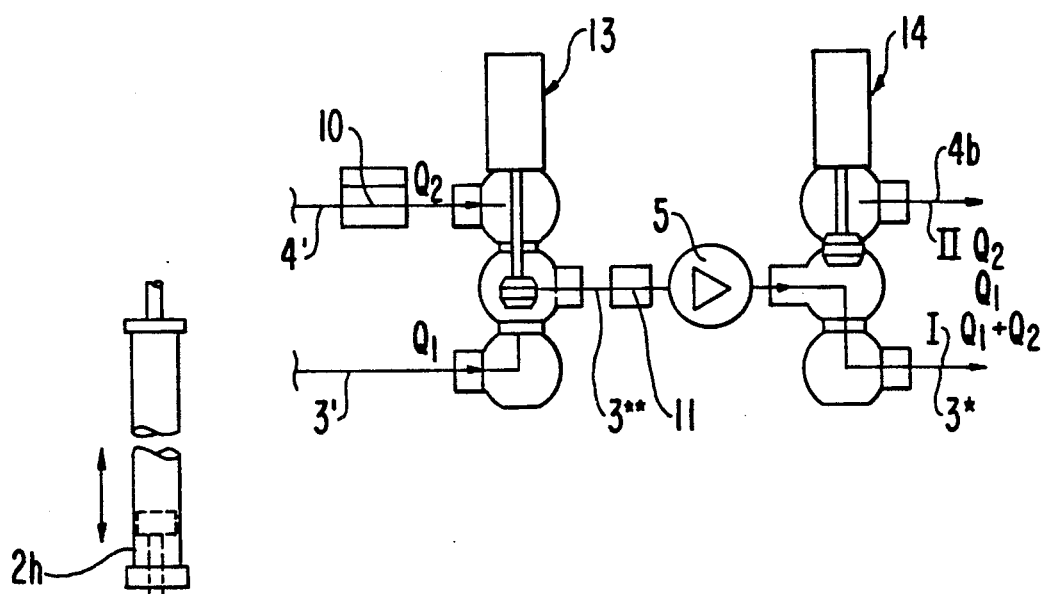
FIG. 3a shows a modified form of the apparatus comprised by this invention.
Figure 3:
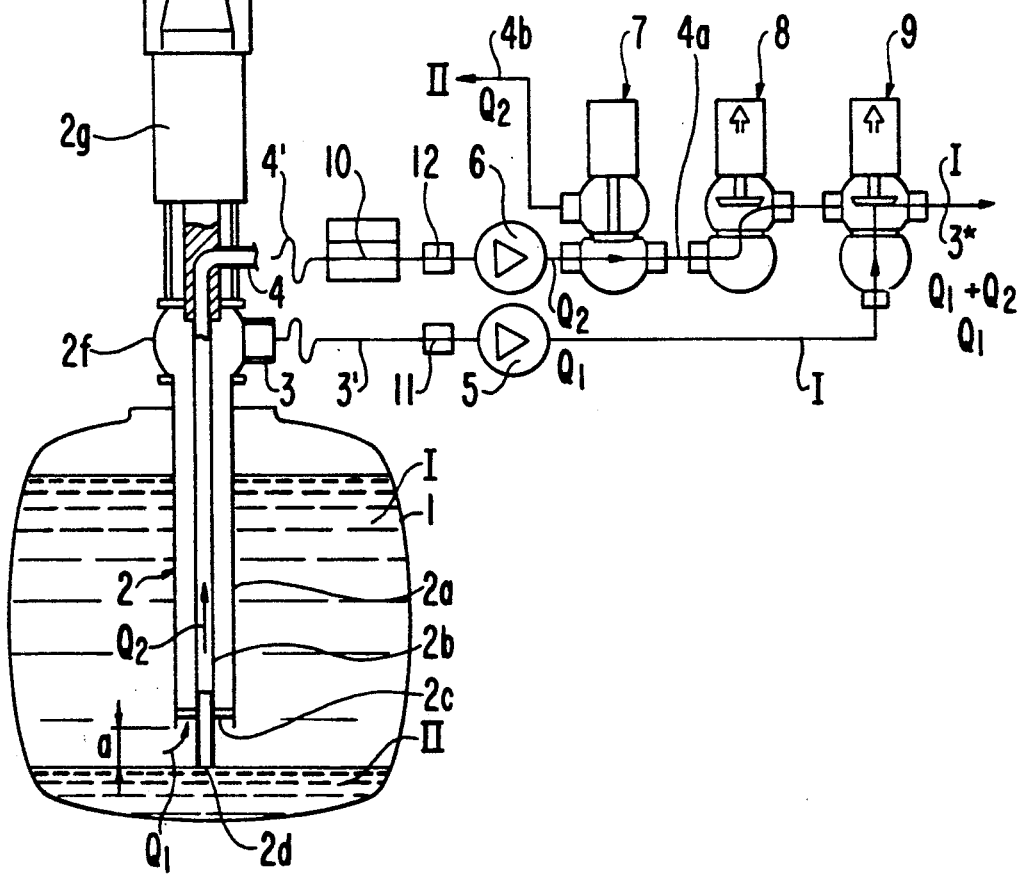
FIG. 3 shows a schematic view of the apparatus comprised by this invention.

FIG. 3 shows the entire apparatus for the practice of this invention. It is not necessary to describe here the apparatus shown inside the container 1 because this has already been discussed in the description of FIG. 1a.

Above the housing 2f is a fitting 2g through which the inner suction tube 2b may be fitted inside the outer suction tube 2a. The positioning of fitting 2g governs the setting of the separation distance "a". This setting is selected on the basis of the conditions of the emptying operation and the flow properties of the separate fluids. The entire apparatus 2 is attached to a sliding connector 2h which permits one to lower the apparatus into the container 1 and then subsequently to withdraw it.

A first transfer line 3' connects the outlet 3 to the combined transfer line 3* by way of a valve 9. The transfer line 3' also contains a pressure switch 11 and a pump 5.

A second transfer line 4', which is connected to the outlet 4, has a branching by way of a valve 7 communicating with either line 4a for the conveyance of Fluid I or to a line 4b for the conveyance of Fluid II. Line 4a can lead also from valve 7 to valve 9 by way of a vale 8. In transfer line 4, the fluid passes first through a sensing device 10 for detecting physical changes in the fluid, then another pressure switch 12 and finally another pump 6.

During the first phase of the operation, when Fluid I is moving in flow stream $Q^2$ and in flow stream $Q_1$, the two transfer lines 3' and 4' convey the fluid by way of valves 7, 8 and 9 into the combined transfer line 3*. Transfer line 3' conveys flow stream $Q_1$, and lines 4 and 4a convey flow stream $Q_2$.

The combined transfer line 3* may be connected to a device for the return and/or treatment of Fluid I. This is not shown. As soon as the lowering of the apparatus 2 causes some of Fluid II to enter inlet 2d, the sensing device 10 will detect the change of $Q_2$ from Fluid I to Fluid II. This causes valve 8 to close so that the flow of $Q_2$ is interrupted. The flow of $Q_1$ through transfer line 3' into combined transfer line 3* continues (see FIG. 1b for the second phase of the operation) until Fluid I is completely removed (this is the end of the third phase of the operation, see FIG. 1c).

The movement of air or inert gas in flow stream $Q_1$ causes the pressure switch 11 to close valve 9 and thus interrupt the flow of stream $Q_1$ and then to lower the apparatus 2 so that the remaining volumes of Fluids I and II may be removed. During this phase of the operation, it is important that valve 7 acts to connect flow line 4' with its branch line 4b. The combined tailings of Fluids I and II may thus travel by way of flow line 4', valve 7 and branch flow line 4b to a device (not shown in the illustration) for the recovery of Fluid I from this mixture of Fluids I and II. Air or inert gas enters flow line 4' at the end of the emptying operation and the changed flow properties causes the pressure switch 12 to terminate the operation.

FIG. 3a shows a modified installation of the apparatus 2 of this invention. In the place of the three valves 7, 8 and 9, there is first a distribution valve 13 and then a second distribution valve 14, which together can be used to combine the flows of transfer line 3' and 4' into the combined transfer line 3** or to separate the flows into transfer lines 4b and 3*. The first distribution valve 13 has an intermediate setting which connects transfer lines 3' and 4' to combined transfer line 3. The second distribution valve 14 has only two settings. In one setting, the general transfer line 3 is connected only to transfer line 4b. In the other setting, it is connected only to transfer line 3*. This application can be controlled by a single pump installation 5 and a single pressure switch 11.

As long as the two transfer lines 3' and 4' are conveying Fluid I, the first distribution valve 13 is in its intermediate setting and the second distribution valve 14 is set so that a connection exists between the general transfer line 3** and the general transfer line 3*. Flow streams $Q_1$ and $Q_2$ pass together through distribution valve 13 and then through distribution valve 14 into transfer line 3*. As soon as the sensor 10 in the second transfer line detects a change in the flow properties of $Q_2$, the distribution valve 13 acts to interrupt the flow between the second transfer line 4' and the general transfer line 3*. The pathway for flow volume $Q_1$ is kept open. As soon as the flow volume $Q_1$ sucks up air or inert gas, the changed flow properties of the flow stream $Q_1$ are sensed by the pressure switch 11 and the distribution valve 13 acts to interrupt the flow steam $Q_1$. Next, the distribution valve 14 moves to its other setting and the pump 5 draws up the remnants of Fluids I and II as the apparatus is lowered into the container. These remnants pass through the transfer line 4 and the general transfer lines 3** and 4b. The end of the sucking up of fluid is again detected by pressure switch 11 and this terminates the transfer operation.

Figure 4:
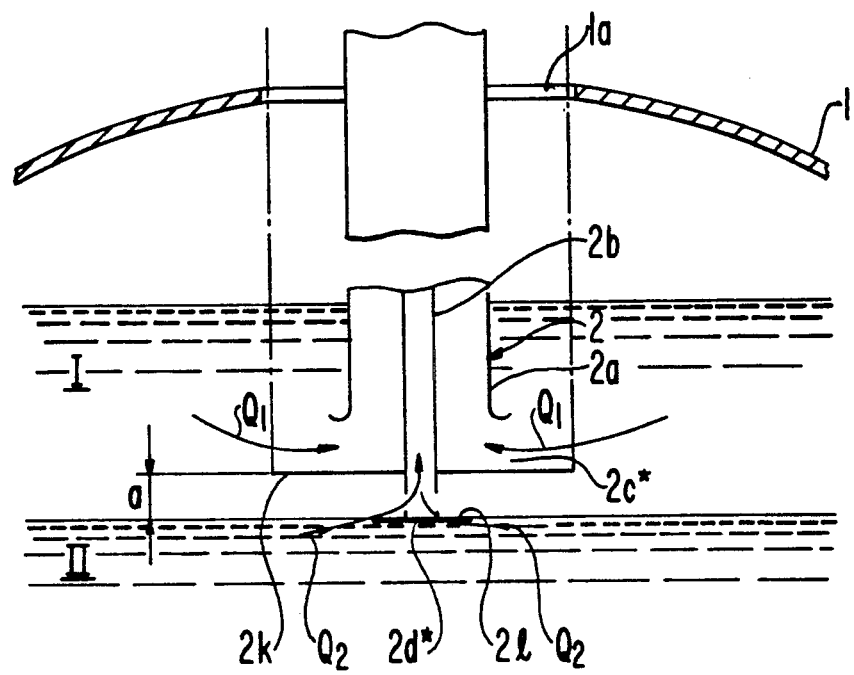
FIG. 4 shows a diagrammatic view of the central section of the suction apparatus comprised by this invention.

FIG. 4 shows an advantageous modification of the inlet of the suction apparatus 2. Under the tip of the outer suction tube inlet 2a, which is rounded and flared to facilitate fluid movement, there is placed a flange or baffle 2k. The inner suction tube 2b passes through the baffle 2k and, thus, the baffle 2k forms a ring-shaped or annular passageway 2c*. The baffle 2k is made as large as possible. Its dimensions are governed by the size of the opening 1a of the headspace of the container 1. This causes the flow stream $Q_1$ to enter the outer suction tube 2a from the side. A large annular passageway 2c* diminishes the velocity of the suction flow with the result that the fluid beneath the baffle 2k remains largely undisturbed. A further modification with a similar action on the lower fluid is the installation of a second baffle 21 below the tip of suction tube 2b. This forms a second annular passageway 2d*. The action of this second baffle 21 is to prevent flow stream $Q_2$ from disturbing Fluid II. As was previously described, this fluid enters the inner suction tube 2b from the side and at a distance "a" from the first baffle 2k. The arrangement of choice is to set the distance "a" smaller than would be possible if no baffle were used, as this increases the yield of Fluid I.

Figure 5:
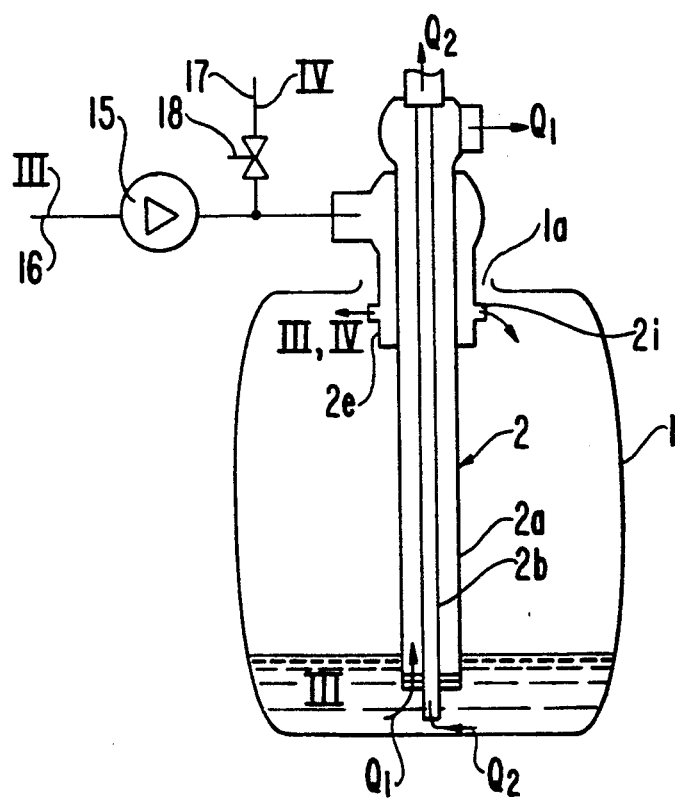
FIG. 5 shows a diagrammatic view of a central section of the apparatus comprised by this invention in the region of the opening in the headspace of the container as the suction apparatus is plunged deeply into the container.

FIG. 5 shows a further modification of the practice of this invention in which cleaning solution III and also inert gas IV may be introduced into container 1. For this purpose, the outer suction tube 2a is ringed by a delivery tube 2e which has outlets 2i. The delivery tube 2e may be connected to a supply tube 16 for conveying cleaning solutions or to a supply tube 17 for conveying inert gas. When used for cleaning, the cleaning solution III travels through supply tube 16 and a pump for cleaning solutions 15 and into the delivery tube 2e and then through outlets 2i to flood the inner surface of the container. The cleaning solution III then collects in the bottom of the container 1 and is next drawn up out of the container 1 through apparatus 2 in the usual manner, either by the outer suction tube 2a or the inner suction tube 2b (flow streams $Q_1$ and $Q_2$).

If the headspace of the container 1 is to be filled with an inert gas IV during the operation, the inert gas IV passes through the supply tube 17 and a gas valve 18 into the delivery tube 2e and through the outlets 2i into the headspace as the fluid is removed.

I claim:

1. Apparatus for the removal and sharp separation of layers of liquids from a container wherein there is an interface between adjacent layers, comprising:
   first mean for defining a flow passage, said first means defining a first flow inlet movable relative to the container;
   second means for defining a flow passage, said second means defining a second flow inlet movable relative to the container, said first and second flow inlets being spaced from one another along a line by a predetermined distance;
   pump means for withdrawing said liquids from the container through said first and second means; and
   means for stopping the flow of liquid through said second means in response to a change in the liquid flowing through said second means from a first liquid to a second liquid.

2. The apparatus according to claim 1, wherein the interior of the container is in communication with a gas, the apparatus further comprising mean for stopping the flow of fluid through said first means in response to a gas flowing through said first means.

3. The apparatus according to claim 1, wherein the container is in communication with a gas, the apparatus further comprising means for stopping the flow of fluid through said second means in response to a gas flowing through said second means.

4. The apparatus according to claim 1, wherein said first means comprises a first suction tube and said second means comprises a second suction tube.

5. The apparatus according to claim 4, wherein said first suction tube and said second suction tube each have a lower end, the lower end of said second suction tube extends below the lower end of said first suction tube, the inlet of said second suction tube is positioned below the lower end of said first suction tube.

6. The apparatus according to claim 5, further comprising baffle means for preventing the disturbance of liquid below said baffle means by flow of fluid entering the inlet of the first suction tube.

7. The apparatus according to claim 6, wherein said baffle means comprises a plate secured to said second suction tube between the inlet of the first suction tube and the inlet of the second suction tube.

8. The apparatus according to claim 6, further comprising a baffle plate secured to said second suction tube and positioned below the inlet to said second suction tube, the baffle plate extending generally transverse to the axis of the second suction tube.

9. The apparatus according to claim 4, wherein said second suction tube is positioned within said first suction tube.

10. The apparatus according to claim 1, wherein said means for stopping the flow of liquid through said second means comprises sensing means for detecting physical changes in the flowing liquid.

11. The apparatus according to claim 10, wherein said sensing means comprises a nephelometer.

12. The apparatus according to claim 10, wherein said sensing means comprises an extinction meter.

13. The apparatus according to claim 2, wherein said means for stopping the flow of fluid through said first means comprises a pressure switch.

14. The apparatus according to claim 3, wherein said means for stopping the flow of fluid through said second means in response to a gas flowing through said second means comprises a pressure switch.

15. The apparatus according to claim 9, wherein said first suction tube and said second suction tube are concentric, the inlet to said second suction tube is defined by an annular space between said first suction tube and said second suction tube, and said annular space has an area at least twice as large as the area of the inlet to said second suction tube.

16. The apparatus according to claim 8, wherein said baffle plate defines with the lower end of said second suction tube an annular inlet to said second suction tube.

17. The apparatus according to claim 1, further comprising means for supplying said container with a fluid, said supply means comprising a delivery tube, said first means and said second means extending through said delivery tube.

18. The apparatus according to claim 1, further comprising a first transfer line connected to said first means, a second transfer line connected to said second means, and valve means for selectively directing fluid in said second transfer in one of a first direction and a second direction.

19. The apparatus according to claim 1, further comprising a second transfer line connected to said first means, a second transfer line connected to said second means, said first and second transfer lines being connected to a common transfer line, and valve means for selectively placing said common transfer line in fluid communication with either said first transfer line or said second transfer line.

20. A process for the automatic removal and sharp separation of layers of liquids from a container through a headspace in the container, wherein there is an interface between adjacent layers, using a suction apparatus including a first flow passage having a first inlet and a second flow passage having a second inlet, wherein said first and second inlets are set at a predetermined distance from one another along a line, comprising:
   inserting said suction apparatus in a direction substantially parallel to said line, through said headspace into the layer of liquid adjacent to said headspace such that said second inlet extends farther into said layer than said first inlet;
   withdrawing the liquid in said layer through said first and second inlets of the suction apparatus;
   moving the suction apparatus toward said interface while performing the step of withdrawing;
   discontinuing the moving step in response to liquid from the layer below the interface entering the suction apparatus; and
   discontinuing withdrawing liquid through said second inlet in response to liquid from the layer below the interface entering the suction apparatus.

21. The process according to claim 20, further comprising discontinuing withdrawing fluid through said first inlet in response to a gas entering said first inlet.

22. The process according to claim 21, further comprising inserting the suction apparatus into the remaining liquids after discontinuing withdrawing fluid through said first inlet.

23. The process according to claim 22, further comprising withdrawing the remaining liquid through the suction apparatus.

24. The process according to claim 20, further comprising tilting the container to minimize the area of the interface between the layers during the step of withdrawing the liquid in the layer adjacent to the headspace.

25. The process according to claim 20, further comprising letting an inert gas into the container to replace the volume of liquid that is removed.

* * * * *